United States Patent
Marinescu (10) Patent No.: US 10,324,159 B2
(45) Date of Patent: Jun. 18, 2019

(54) SIGNAL ASSESSMENT SYSTEM AND SIGNAL ASSESSMENT METHOD

(71) Applicant: Rohde & Schwarz GmbH & Co. KG, München (DE)

(72) Inventor: Radu-Sebastian Marinescu, Bucharest (RO)

(73) Assignee: ROHDE & SCHWARZ GMBH & CO. KG, München (DE)

( * ) Notice: Subject to any disclaimer, the term of this patent is extended or adjusted under 35 U.S.C. 154(b) by 5 days.

(21) Appl. No.: 15/882,747

(22) Filed: Jan. 29, 2018

(65) Prior Publication Data
US 2019/0041486 A1 Feb. 7, 2019

(30) Foreign Application Priority Data
Aug. 2, 2017 (EP) .................................. 17465534

(51) Int. Cl.
*G10L 25/51* (2013.01)
*G01S 5/02* (2010.01)
(Continued)

(52) U.S. Cl.
CPC .............. *G01S 5/0215* (2013.01); *G01S 3/46* (2013.01); *G01S 5/0252* (2013.01);
(Continued)

(58) Field of Classification Search
CPC ........ G01S 5/0215; G01S 5/0252; G01S 3/46; G08G 5/0008; G08G 5/0013;
(Continued)

(56) References Cited

U.S. PATENT DOCUMENTS

| | | | | |
|---|---|---|---|---|
| 6,160,497 A | * | 12/2000 | Clark | ........................ G01S 7/04 340/945 |
| 6,175,314 B1 | * | 1/2001 | Cobley | ................ G08G 5/0013 340/945 |

(Continued)

FOREIGN PATENT DOCUMENTS

| | | |
|---|---|---|
| DE | 102013212067 A1 | 1/2015 |
| JP | S62291586 A | 12/1987 |

OTHER PUBLICATIONS

European Search Report for European Patent Application No. 17 46 5534, dated Feb. 9, 2018, 11 pages.
(Continued)

*Primary Examiner* — Hai V Nguyen
(74) *Attorney, Agent, or Firm* — Westman, Champlin & Koehler, P.A.

(57) ABSTRACT

The present invention provides a signal assessment system for assessing air traffic control signals, the signal assessment system comprising at least two wireless signal receivers configured to receive wireless signals, a signal comparator coupled to the wireless signal receivers and configured to compare the received wireless signals and to provide respective comparison results, and a user indicator coupled to the signal comparator configured to indicate to a user based on the comparison results if the received wireless signals originate from the same wireless source signal or if the received wireless signals originate from different wireless source signals. Further, the present invention provides a signal assessment method.

16 Claims, 4 Drawing Sheets

(51) Int. Cl.
*G01S 3/46* (2006.01)
*G08G 5/00* (2006.01)
*G10L 25/03* (2013.01)
*G10L 25/12* (2013.01)

(52) U.S. Cl.
CPC ......... G08G 5/0008 (2013.01); G08G 5/0013 (2013.01); G08G 5/0078 (2013.01); G08G 5/0082 (2013.01); G10L 25/51 (2013.01); *G08G 5/0043* (2013.01); *G10L 25/03* (2013.01); *G10L 25/12* (2013.01)

(58) Field of Classification Search
CPC .. G08G 5/0078; G08G 5/0082; G08G 5/0043; G10L 25/51; G10L 25/03; G10L 25/12
USPC .................................................. 455/67.7, 563
See application file for complete search history.

(56) References Cited

U.S. PATENT DOCUMENTS

| | | | | |
|---|---|---|---|---|
| 6,529,866 | B1* | 3/2003 | Cope | G10L 21/0208 381/94.3 |
| 7,221,290 | B2* | 5/2007 | Burgemeister | G08G 5/0013 340/3.62 |
| 7,433,384 | B2* | 10/2008 | Smee | H04B 7/0848 375/142 |
| 7,702,505 | B2* | 4/2010 | Jung | G10L 15/20 704/234 |
| 7,809,405 | B1* | 10/2010 | Rand | G08G 5/0013 455/431 |
| 8,019,489 | B2* | 9/2011 | Harrison | G01C 23/005 455/431 |
| 8,188,907 | B2* | 5/2012 | O'Neil | G01S 5/0072 340/961 |
| 8,386,252 | B2* | 2/2013 | Michaelis | G09B 19/04 704/231 |
| 8,554,457 | B2* | 10/2013 | White | G08G 5/065 701/120 |
| 8,676,141 | B1* | 3/2014 | Vargantwar | H04W 52/42 370/328 |
| 8,681,040 | B1* | 3/2014 | Rathinam | G08G 5/0008 342/29 |
| 9,132,913 | B1* | 9/2015 | Shapiro | B64C 19/00 |
| 9,135,916 | B2* | 9/2015 | Nutaro | G10L 15/26 |
| 9,171,476 | B2* | 10/2015 | White | G08G 5/065 |
| 9,262,927 | B2* | 2/2016 | Populus | G08G 5/0013 |
| 9,371,140 | B1* | 6/2016 | Johnson | B64D 45/00 |
| 9,443,433 | B1* | 9/2016 | Conway | G08G 5/0013 |
| 9,446,852 | B2* | 9/2016 | Lacko | B64D 45/00 |
| 9,508,262 | B2* | 11/2016 | Kar | G08G 5/0008 |
| 9,616,993 | B1* | 4/2017 | Shapiro | B64C 19/00 |
| 9,620,020 | B2* | 4/2017 | Wang | G10L 25/51 |
| 9,641,365 | B2 | 5/2017 | Detert | |
| 9,691,287 | B1* | 6/2017 | Shapiro | G06F 3/013 |
| 9,805,273 | B1* | 10/2017 | Seeber | G06T 7/223 |
| 9,830,829 | B1* | 11/2017 | Doyen | G08G 5/0082 |
| 9,830,910 | B1* | 11/2017 | Shapiro | G08G 5/0013 |
| 10,037,632 | B2* | 7/2018 | Dudar | B64C 39/024 |
| 10,157,616 | B2* | 12/2018 | Agarwal | G06F 3/16 |
| 10,229,329 | B2* | 3/2019 | Seeber | G06K 9/00771 |
| 10,235,892 | B1* | 3/2019 | Colligan | G08G 5/0078 |
| 2004/0128039 | A1* | 7/2004 | Podowski | G07C 5/008 701/33.4 |
| 2006/0046715 | A1* | 3/2006 | Burgemeister | G08G 5/0013 455/431 |
| 2006/0129391 | A1* | 6/2006 | Jung | G10L 15/20 704/226 |
| 2007/0189328 | A1* | 8/2007 | Judd | G10L 15/26 370/466 |
| 2007/0241936 | A1* | 10/2007 | Arthur | G01C 23/00 340/958 |
| 2007/0288128 | A1* | 12/2007 | Komer | G10L 15/26 701/3 |
| 2008/0154441 | A1* | 6/2008 | Harrison | G01C 23/005 701/3 |
| 2011/0063159 | A1* | 3/2011 | O'Neil | G01S 5/0072 342/29 |
| 2011/0282669 | A1* | 11/2011 | Michaelis | G09B 19/04 704/270 |
| 2012/0022774 | A1* | 1/2012 | Pinheiro | G08G 5/0013 701/120 |
| 2012/0075124 | A1* | 3/2012 | Whitlow | G08G 5/0021 340/971 |
| 2012/0245836 | A1* | 9/2012 | White | G08G 5/065 701/120 |
| 2013/0027226 | A1* | 1/2013 | Cabos | G08G 5/0013 340/961 |
| 2013/0265187 | A1* | 10/2013 | Hall | G01S 13/9303 342/37 |
| 2014/0039734 | A1* | 2/2014 | Ramaiah | G01W 1/02 701/14 |
| 2014/0039783 | A1* | 2/2014 | White | G08G 5/065 701/120 |
| 2014/0195139 | A1* | 7/2014 | Smith | G08G 5/0013 701/120 |
| 2014/0244246 | A1* | 8/2014 | Nutaro | G10L 15/32 704/226 |
| 2014/0316538 | A1* | 10/2014 | Rataj | G10L 15/22 700/12 |
| 2015/0081292 | A1* | 3/2015 | Populus | G08G 5/0013 704/235 |
| 2015/0364044 | A1* | 12/2015 | Kashi | G08G 5/0095 701/120 |
| 2016/0149737 | A1 | 5/2016 | Detert | |
| 2016/0155435 | A1* | 6/2016 | Mohideen | G08G 5/0013 704/235 |
| 2016/0247405 | A1* | 8/2016 | Paczan | G08G 5/0039 |
| 2016/0284220 | A1* | 9/2016 | Kar | G08G 5/0008 |
| 2017/0039858 | A1* | 2/2017 | Wang | G10L 25/51 |
| 2017/0124734 | A1* | 5/2017 | Gowda | G06T 11/20 |
| 2017/0163455 | A1 | 6/2017 | Detert | |
| 2018/0091908 | A1* | 3/2018 | Goel | H04R 29/00 |
| 2018/0128895 | A1* | 5/2018 | Seeber | G08G 5/0026 |
| 2018/0129635 | A1* | 5/2018 | Saptharishi | B64D 43/00 |
| 2018/0129881 | A1* | 5/2018 | Seeber | G06K 9/00771 |
| 2018/0155052 | A1* | 6/2018 | Lacroix | G08G 5/0013 |
| 2018/0174588 | A1* | 6/2018 | Agarwal | G06F 3/16 |

OTHER PUBLICATIONS

Anonymous: "Blocked Transmissions/ Undetected Simultaneous Transmissions (USiT)—SKYbrary Aviation Safety", Sep. 2, 2016 (Sep. 2, 2016), XP055449929, Retrieved from the Internet: URL:https://web.archive.org/web/20160902184642/http://www.skybrary.aero:80/index.php/Blocked_Transmissions_/_Undetected_Simultaneous_Transmissions_(USiT) [retrieved on Feb. 9, 2018], 6 pages.

* cited by examiner

SIGNAL ASSESSMENT SYSTEM AND SIGNAL ASSESSMENT METHOD

TECHNICAL FIELD

The present invention relates to a signal assessment system. The present invention further relates to a corresponding signal assessment method.

BACKGROUND

Although applicable in principle to any system that is used for wireless communication, the present invention and its underlying problem will be hereinafter described in combination with air traffic control systems.

Air traffic control communication systems are used for communication between air traffic controllers and the pilots in the aircraft. Such signals usually use amplitude modulated signals to transmit voice data. However, when two amplitude modulated signals are transmitted at the same time, the signal with the lower signal level may be completely masked or hidden by the signal with the higher signal level.

In modern air traffic control systems a single air traffic controller operates a system with multiple radios. Such a system may e.g. comprise three radios each with an individual antenna. The antennas of the single radios are usually distributed at different locations, such that the single antennas may receive different signals.

Usually a best signal selection is performed in the air traffic control systems and only the signal with the strongest signal is provided to the air traffic controller.

SUMMARY

Against this background, there is the need to provide information about concurrently received signals in air traffic control systems.

According to a first aspect, a signal assessment system for assessing air traffic control signals is provided, the signal assessment system comprising at least two wireless signal receivers configured to receive wireless signals, e.g. voice conversations for air traffic control, a signal comparator coupled to the wireless signal receivers and configured to compare the received wireless signals and to provide respective comparison results, and a user indicator coupled to the signal comparator configured to indicate to a user based on the comparison results if the received wireless signals originate from the same wireless source signal or if the received wireless signals originate from different wireless source signals.

According to a second aspect, a signal assessment method for assessing air traffic control signals is provided, the signal assessment method comprising receiving wireless signals with at least two wireless receivers, comparing the received wireless signals, providing respective comparison results, and indicating to a user based on the comparison results if the received wireless signals originate from the same wireless source signal or if the received wireless signals originate from different wireless source signals.

In air traffic control systems, as explained above, usually a best signal selection is performed prior to providing a signal, e.g. a voice communication, to the air traffic controller. The present invention is based on the finding that single signals may be masked by a stronger signal if they are concurrently received by the wireless signal receivers of the air traffic control system.

The present invention therefore provides a signal assessment system that may e.g. be integrated into air traffic control systems. This means that the elements of the signal assessment system may be at least in part be elements of the air traffic control system or be implemented in or with elements of the air traffic control system. For example, the wireless signal receivers of the signal assessment system may be the wireless signal receivers of an air traffic control system and the received wireless signals may be the wireless signals received by the air traffic control system, e.g. pilots' voice communications.

The wireless signal receivers may e.g. be wireless signal receivers for receiving amplitude modulated or AM signals as they are usually used in air traffic control systems. Depending on the positions of the wireless signal receivers and the signal emitters, e.g. aircraft, different wireless signal receivers may receive different wireless signals with different signal levels or power levels. A common air traffic control system may select the received signal with the best power level, e.g. the highest signal level.

If however, the wireless signal receivers do not receive the same signal but different signals, the signal with the lowest power level may be masked out by the signal with the highest power level.

The signal assessment system therefore comprises the signal comparator that is coupled, directly or indirectly, to the wireless signal receivers. The signal comparator then compares the wireless signals received by the different wireless signal receivers of the signal assessment system. Comparing in this regard does not refer to comparing the signal level or power levels of the received wireless signals. Instead comparing in this regard refers to comparing the signals with regard to content. This means that the signal comparator tries to identify if the received wireless signals are the same signals from the same source, e.g. the same aircraft.

If for example two or more wireless signal receivers receive two different signals from two different aircraft, the signal comparator may determine that two different signals are received. Then the user indicator may provide an indication to the user of the signal assessment system, e.g. to an air traffic controller, that indicates to the user that two different signals have been received. The user will then know that the signal that was selected based on a "best signal selection", is masking another signal. The user may then e.g. request the emitter of the masked signal, e.g. a pilot of an aircraft, to repeat his voice communication.

The signal comparator may also determine that all received wireless signals are the same signals, i.e. all wireless signals originate from the same source like e.g. an aircraft. In this case the user indicator may keep silent and provide no information to the user or may indicate to the user that a best signal selection may be performed as usually and that no second signal is masked.

The user indicator may e.g. be a visual indicator. Such a visual indicator may be provided by a discrete light source or e.g. as a visible indicator on a display of the signal assessment system that may be the display of an air traffic control system. Another possible type of indicator is an audible indicator that may e.g. be played via headphones that the user wears.

With the present invention a "best signal selection" arrangement may therefore be augmented or expanded to not only provide the best signal to the user. Instead, the signal assessment system expands the "best signal selection" arrangement to also indicate to the user if the selected signal was the best, i.e. strongest, of a plurality of received same wireless signals or the best, i.e. strongest, of a plurality of different wireless signals.

Further embodiments of the present invention are subject of the further subclaims and of the following description, referring to the drawings.

In a possible embodiment, the signal comparator may comprise a server that may be communicatively coupled to the single wireless signal receivers.

A server as signal comparator may be provided not only for a single signal assessment system. Instead e.g. a single server may be provided at an airport for all air traffic controller workstations. The server may comprise a high power processing unit or a plurality of such processing units with the respective operating memory and storage. Such a server may therefore serve multiple signal assessment systems concurrently. It is understood, that two redundant server may be provided for safety reasons.

The server may e.g. be coupled to the single wireless signal receivers via digital signal lines, like e.g. discrete lines, a digital data network like Ethernet, or any other digital interface, like e.g. a wireless communication interface. The server may e.g. comprise an Ethernet interface or any other interface that may couple the server to the single wireless signal receivers. It is understood that the server may comprise one dedicated Ethernet interface for every one of the wireless signal receivers for redundancy, instead of a single Ethernet interface.

It is understood, that the server may also be coupled to the single wireless signal receivers via analog signal lines that provide the demodulated received wireless signals, e.g. AM signals, to the server for example as audio signals via audio lines. It is further understood, that in that case the server may comprise an analog to digital converter, e.g. a sound card, to convert the analog signals into digital signals for further processing.

The server may further comprise a signal storage, e.g. a hard disk, for storing the received wireless signals. If a user receives the information that a second wireless signal may possibly have been masked out by the wireless signal that was selected by the best signal selection, the user may choose to load the stored second signal from the server and replay that signal.

The functions explained above and below regarding the signal comparator may e.g. be implemented on the server as software or computer executable instructions that may be executed by the processor of the server and that may be stored in the memory of the server. It is understood, that the server in addition to the processor, a memory like RAM memory, and a storage like a hard disk may also comprise a bus like a PCI-bus that couples the processor to the peripherals, like e.g. sound cards or Ethernet interfaces.

In a possible embodiment, the signal comparator may comprise a delay compensator that may be configured to compensate the time delay of the received wireless signals prior to comparing the received wireless signals.

Depending on the distance between the single receivers the single receivers may receive the wireless signals with a respective delay or time difference. The time difference will be zero if the emitter is spaced apart from the single receivers at the same distance. In an extreme case, the emitter and the wireless signal receivers are positioned on a line. In this case the difference will be maximized.

In order to successfully compare the received wireless signals, the signal comparator may therefore comprise the delay compensator that may detect such a delay or time difference. It is understood, that the wireless signal receivers may e.g. comprise synchronized clocks and may provide the received wireless signals to the signal comparator with respective time stamps. The delay compensator may therefore use the time stamps to analyze the delay or time difference in the received wireless signals.

The delay compensator may e.g. perform a search in the single received signals for a signal level that is above the permanent noise level in the received wireless signals. Such a signal level may indicate the start of a communication via the received wireless signal. The delay compensator may then compare the time of occurrence of such a signal level for all received wireless signals to determine the time difference or delay. It is understood, that the delay compensator may also verify if the delay or time difference is larger than a predetermined threshold. Since the distance between the receivers is known and the wireless signals travel approximately at the speed of light, the maximum possible delay may easily be calculated and used as the threshold level. The delay compensator may then align the received wireless signals accordingly, to allow a direct comparison of the received wireless signals.

The delay compensator may e.g. comprise a threshold comparator for comparing the signal levels of the received signals with a threshold value that marks the noise level. If the received wireless signals are received with time stamps the delay compensator may store the time stamps of the respective samples of the received wireless signals in a memory. If no time stamps are provided, the delay compensator may comprise a clock or timer. The delay compensator may count the time from the first occurrence of a signal level above the noise level in a first one of the received wireless signals to the occurrence of such a signal level in the other received wireless signals. The delay compensator may also comprise a timeout comparator that may compare the time differences or delays with a maximum allowed or threshold delay. If the time difference is larger than the maximum allowed or threshold delay, there may be no signal received by that respective receiver. The respective emitter may then e.g. be discarded for the current signal analysis turn.

In a possible embodiment, the signal comparator may comprise a decomposition unit configured to decompose the received wireless signals into Mel Frequency Cepstral Coefficients or MFCCs, and the signal comparator may comprise a coefficient comparator that may be configured to compare the determined Mel Frequency Cepstral Coefficients and provide respective comparison results.

The mel-frequency cepstrum (MFC) is a representation of the short-term power spectrum of the received wireless signals, i.e. pilots' voice communication. The MFC is based on a linear cosine transform of a logarithmic power spectrum on a nonlinear mel scale of frequency. The mel scale approximates the human auditory system's response more closely than the linearly-spaced frequency bands used in a normal cepstrum.

The mel-frequency cepstral coefficients (MFCCs) are the coefficients that collectively make up an MFC. They may be derived from a type of cepstral representation of the audio clip.

The decomposition unit may e.g. derive the MFCCs by performing a Fourier transform of the received wireless signals, especially of a windowed excerpt thereof. Then the powers of the spectrum obtained above may be mapped onto the mel scale, e.g. using a triangular overlapping window. Then the logarithm of the powers at each of the mel frequencies may be determined. Finally, a discrete cosine transform of the list of logarithmized mel powers if performed. The MFCCs are the amplitudes of the resulting spectrum. It is understood, that this scheme is just an example and that variations may exist.

The coefficient comparator may then compare the determined Mel Frequency Cepstral Coefficients. The coefficient comparator may e.g. compare the single MFCCs and determine respective MFCCs to match if they both are equal.

The decomposition unit may e.g. be provided as a set of computer instructions, e.g. a function or library, that when executed by a processor performs the above described functionality on a digital signal, i.e. a digital representation of the received wireless signals. As alternative, the described functionality may also be implemented in hardware, e.g. in a configurable hardware element, like e.g. a FPGA. The same applies to the coefficient comparator.

In a possible embodiment, the coefficient comparator may be configured to determine respective Mel Frequency Cepstral Coefficients of two received wireless signals to match if they comprise less than a predetermined distance to each other.

The predetermined distance may refer to an absolute difference of the Mel Frequency Cepstral Coefficients. As an alternative the predetermined distance may also refer to a relative distance, e.g. expressed as a percentage.

If the coefficient comparator uses the predetermined distance to compare the different received wireless signals, similar received wireless signals may also be identified as originating from the same source. This is especially useful to account for slight modifications of the original source signals in the signal path and the wireless signal receivers.

In a possible embodiment, the signal comparator may comprise a warping unit configured to perform a dynamic time warping on the received wireless signals and to provide respective comparison results that may also be called similarity results in this case.

Dynamic time warping or DTW is a term used in time series analysis and refers to an algorithm for measuring similarity between two temporal sequences which may vary in speed. For instance DTW is applied to temporal sequences of video, audio, and graphics data. DTW may e.g. be used in automatic speech recognition, and other applications may include partial shape matching applications.

In general, DTW is a method that calculates an optimal match between two given time series, in this case audio data. The sequences are non-linearly "warped" in time to determine a measure of their similarity independent of certain non-linear variations in the time dimension. This sequence alignment method is often used in time series classification, like e.g. the comparison of voice conversations or sections of the voice conversations in the received wireless signals.

The warping unit may e.g. be provided as a set of computer instructions, e.g. a function or library, that when executed by a processor performs the above described functionality on a digital signal, i.e. a digital representation of the received wireless signals. As alternative, the described functionality may also be implemented in hardware, e.g. in a configurable hardware element, like e.g. a FPGA.

In a possible embodiment, the signal comparator may comprises a linear predictive coding unit configured to perform a linear predictive coding on the received wireless signals, and the signal comparator may comprise a filter coefficient comparator that is configured to compare coefficients resulting from the linear predictive coding to provide respective comparison results.

Linear predictive coding or LPC may be used in audio signal processing or speech processing, as is the case for the voice conversations in the received wireless signals. LPC represents the spectral envelope of a digital signal of speech in compressed form, using the information of a specific linear predictive model. LPC provides a very accurate estimates of speech parameters.

Possible representations of a linear predictive coded signal are the filter coefficients that may e.g. be determined by linear prediction. These coefficients may then be subject to comparison by the filter coefficient comparator. Other possible representations comprise log area ratios, LAR, and e.g. line spectral pairs, LSP decomposition and reflection coefficients.

The linear predictive coding unit may e.g. be provided as a set of computer instructions, e.g. a function or library, that when executed by a processor performs the above described functionality on a digital signal, i.e. a digital representation of the received wireless signals. As alternative, the described functionality may also be implemented in hardware, e.g. in a configurable hardware element, like e.g. a FPGA. The same applies to the filter coefficient comparator.

In a possible embodiment, the signal assessment system may comprise a signal evaluation unit that may be configured to determine based on the comparison results if the received wireless signals originate from the same source signal or if the received wireless signals originate from different source signals.

The signal comparator may provide different types of comparison results. The signal comparator may e.g. provide the information if the MFCCs for the wireless signals received by the different wireless signal receivers are within a specific range from each other. The signal comparator may also provide the information if the dynamic time warped received wireless signals and/or the coefficients resulting from the linear predictive coding are similar to such an extent that they probably originate in the same source signal. It is understood, that the signal comparator may perform only one type of analysis or any combination of analysis types as described above.

The signal evaluation unit may then use this information and qualify the single wireless signals received by the wireless signal receivers as originating from the same source signal or as originating from different source signals.

If at least two wireless signals from different sources are detected, the signal comparator may issue a respective signal to the user indicator to indicate to the user that two wireless signals have been transmitted concurrently and one of the wireless signals may have been masked out by the best signal selection.

BRIEF DESCRIPTION OF THE DRAWINGS

For a more complete understanding of the present invention and advantages thereof, reference is now made to the following description taken in conjunction with the accompanying drawings. The invention is explained in more detail below using exemplary embodiments which are specified in the schematic figures of the drawings, in which.

The appended drawings are intended to provide further under-standing of the embodiments of the invention. They illustrate embodiments and, in conjunction with the description, help to explain principles and concepts of the invention. Other embodiments and many of the advantages mentioned become apparent in view of the drawings. The elements in the drawings are not necessarily shown to scale.

In the drawings, like, functionally equivalent and identically operating elements, features and components are provided with like reference signs in each case, unless stated otherwise.

DETAILED DESCRIPTION OF THE DRAWINGS

Figure 1:
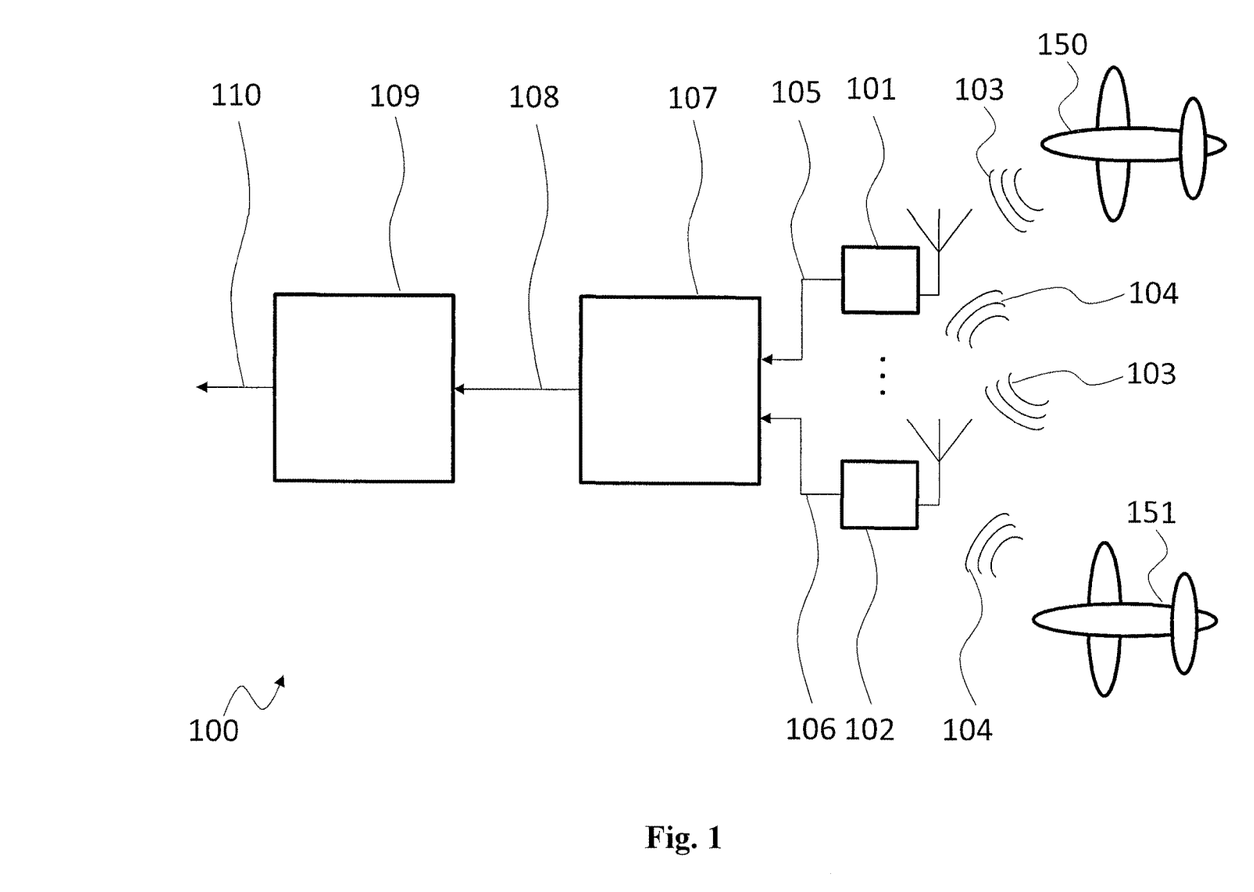
FIG. 1 shows a block diagram of an embodiment of a signal assessment system according to the present invention.

FIG. 1 shows a block diagram of a signal assessment system 100. The signal assessment system 100 comprises a plurality of wireless signal receivers 101, 102. Although only two wireless signal receivers 101, 102 are shown, it is understood, that any number of wireless receivers is possible (hinted at by three dots). The wireless signal receivers 101, 102 are coupled to a signal comparator 107 that provides a comparison result 108 to a user indicator 109. Depending on the comparison result 108 the user indicator 109 will provide an indication signal 110.

The wireless signal receivers 101, 102 may be AM receivers and may receive source signal 103 from aircraft 150 and source signal 104 from aircraft 151. The source signals 103, 104 may be AM modulated signals. This means that the source signals 103, 104 may overlay each other and the stronger signal may mask out the weaker signal in the wireless signal receivers 101, 102. The source signals 103, 104 may be communication signals of an air traffic control system (not separately shown).

Both wireless signal receivers 101, 102 provide the received signals 105, 106 to the signal comparator 107. The signal comparator 107 will then compare the received signals 105, 106 for identity. "Identity" in this context does not refer to e.g. bit-wise identity. Instead "identity" in this context refers to the received signals 105, 106 being based on the same source signal 103, 104. If this is the case, the comparison result 108 may be positive and the user indicator 109 may issue no indication signal 110 or a positive indication signal 110.

If however the comparison result is negative, i.e. the received signals 105, 106 do not originate from the same source signal 103, 104, the user indicator 109 may provide an indication signal 110 to the user or change a positive indication signal 110 into a negative indication signal 110.

Such an indication signal 110 may e.g. comprise an indication light, a pop-up window in a screen or an audible indication signal 110.

It may e.g. happen that wireless signal receiver 101 receives both source signals 103, 104, while wireless signal receiver 102 may only receive source signal 104. In wireless signal receiver 101 the source signal 103 may be received with the strongest signal level and may therefore mask the source signal 104. The source signal 103 will therefore be forwarded as received wireless signal 105. This means that both wireless signal receivers 101, 102 forward two different received signals 105, 106. A best signal selection may now simply select the received signals 105, 106 with the strongest signal level. The other one of the received signals 105, 106 will then simply be omitted.

With the signal assessment system 100 the user would at least be notified by the indication signal 110 of the suppressed or masked source signal 103, 104 and could take respective actions. The user may e.g. request a playback of the masked-out source signal 103, 104. Since all signals are transmitted to the signal comparator 107, the signal comparator 107 may store the source signals 103, 104 for later playback. It is understood, that any other element of the signal assessment system 100 may be adapted to or a dedicated element may be provided to store the source signals 103, 104 for later playback.

Figure 2:
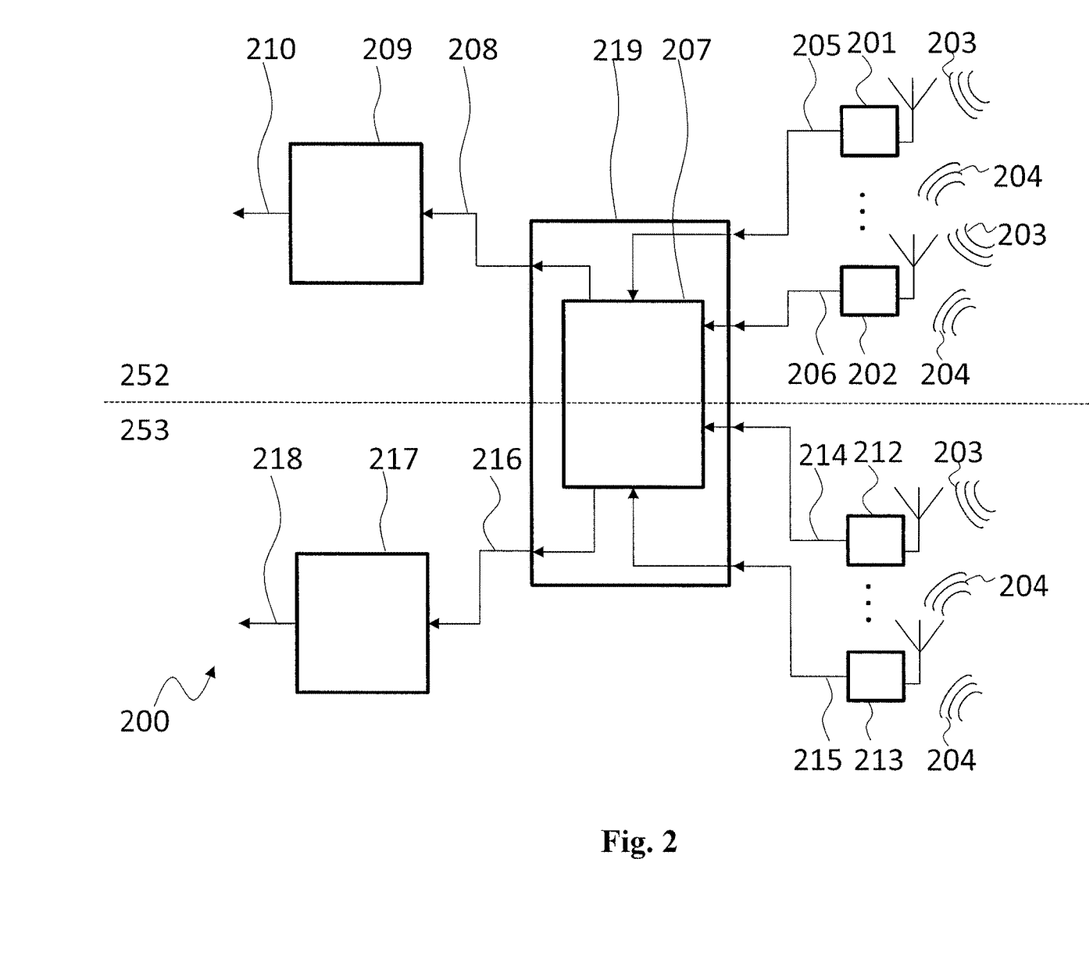
FIG. 2 shows a block diagram of another embodiment of a signal assessment system according to the present invention.

FIG. 2 shows a block diagram of a signal assessment system 200. The signal assessment system 200 is a dual signal assessment system 200 that comprises two air traffic control systems 252, 253. Each of the air traffic control systems 252, 253 may be operated by one air traffic controller. Both air traffic control systems 252, 253 are based on the signal assessment system 100 and share the signal comparator 207 that is provided by a server 219.

The air traffic control system 252 and the air traffic control system 253 each comprises a number of wireless signal receivers 201, 202, 212, 213. The wireless signal receivers 201, 202, 212, 213 are coupled to the server 219 via network lines, e.g. via Ethernet communication lines. It is understood, that although separate communication lines are shown, a switch may be provided that is connected to the server 219 and that is coupled to the single wireless signal receivers 201, 202, 212, 213.

The signal comparator 207 in the server 219 then provides separate indication signals 210, 218 for the air traffic control systems 252, 253.

The signal assessment system 200 demonstrates that a central server 219 may be used or may provide a central or dedicated signal comparator 207 for a plurality of air traffic control systems 252, 253. It is understood, that the two shown air traffic control systems 252, 253 are just exemplarily shown, and that any other number of air traffic control systems is also possible.

The server 219 may e.g. perform the storage of the source signals 203, 204 as described above in conjunction with FIG. 1.

Figure 3:
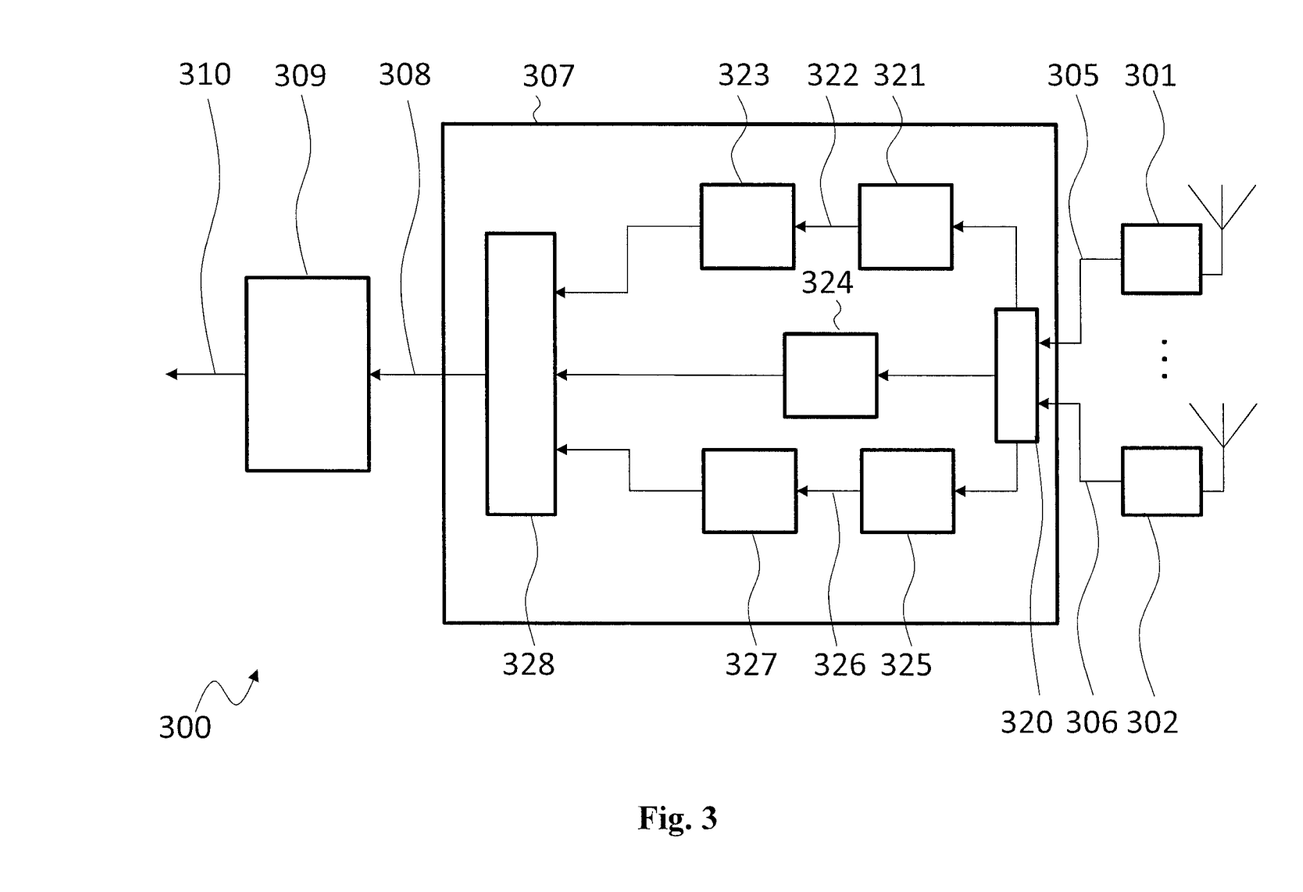
FIG. 3 shows a block diagram of another embodiment of a signal assessment system according to the present invention.

FIG. 3 shows a block diagram of a signal assessment system 300. The signal assessment system 300 is based on the signal assessment system 100 and therefore also comprises wireless signal receivers 301, 302 that are coupled to a signal comparator 307. The signal comparator 307 is coupled to the user indicator 309.

The wireless signal receivers 301, 302 provide the received signals 105, 106 to the signal comparator 307 as in the signal assessment system 100.

However, the signal comparator 307 comprises a delay compensator 320 that supplies the delayed received signals 305, 306 to three parallel signal chains. Each of the signal chains provides a comparison result to a signal evaluation unit 328 that provides the comparison result 308 to the user indicator 309.

The first signal chain comprises a decomposition unit 321 that decomposes the received wireless signals 305, 306 into Mel Frequency Cepstral Coefficients 322 and provides the Mel Frequency Cepstral Coefficients 322 to a coefficient comparator 323. The coefficient comparator 323 compares the determined Mel Frequency Cepstral Coefficients 322 of the different received signals 305, 306 and provides a respective first comparison results.

The coefficient comparator 323 may determine respective Mel Frequency Cepstral Coefficients 322 of two received wireless signals 305, 306 to match if they comprise less than a predetermined distance to each other.

The second signal chain comprises a warping unit 324 that performs a dynamic time warping on the received wireless signals 305, 306. The result of the dynamic time warping may already be or comprise a measure of the similarity of the received signals 305, 306 and may therefore be a second comparison result.

The third signal chain comprises a linear predictive coding unit 325 that performs a linear predictive coding on the received wireless signals 305, 306. The linear predictive coding will result in a set of filter coefficients 326 that are provided to a filter coefficient comparator 327. The filter coefficient comparator 327 is configured to compare the filter coefficients 326 resulting from the linear predictive coding to provide a respective third comparison result.

It is understood, that any single one of the above signal chains or any combination of the above signal chains, e.g. the first and the second, the first and the third or the second and third signal chain, may be provided in a signal assessment system 300.

The signal evaluation unit 328 may then perform a selection or other type of determination to unify the single comparison results of the signal chains into the comparison result 308. The signal evaluation unit 328 may e.g. provide a negative comparison result 308 if only one of the single comparison results is negative or if the majority of the single comparison results is negative.

For sake of clarity in the following description of the method based FIG. 4 the reference signs used above in the description of apparatus based FIGS. 1-3 will be maintained.

Figure 4:
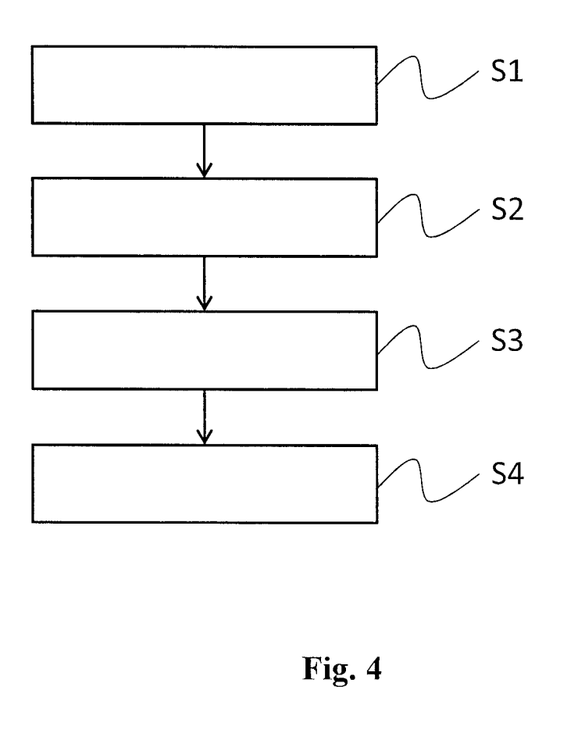
FIG. 4 shows a flow diagram of an embodiment of a signal assessment method according to the present invention.

FIG. 4 shows a flow diagram of a signal assessment method for assessing air traffic control signals.

The signal assessment method comprises receiving S1 wireless signals with at least two wireless receivers, comparing S2 the received wireless signals 105, 106, 205, 206, 214, 215, 305, 306, providing S3 respective comparison results 108, 208, 216, 308, and indicating S4 to a user based on the comparison results 108, 208, 216, 308 if the received wireless signals 105, 106, 205, 206, 214, 215, 305, 306 originate from the same wireless source signal 103, 104, 203, 204 or if the received wireless signals 105, 106, 205, 206, 214, 215, 305, 306 originate from different wireless source signals 103, 104, 203, 204.

Comparing S2 and providing S3 may e.g. be performed with a server 219 that is communicatively coupled to the single wireless signal receivers 101, 102, 201, 202, 212, 213, 301, 302. Further, indicating may comprise determining based on the comparison results 108, 208, 216, 308 if the received wireless signals 105, 106, 205, 206, 214, 215, 305, 306 originate from the same source signal 103, 104, 203, 204 or if the received wireless signals 105, 106, 205, 206, 214, 215, 305, 306 originate from different source signals 103, 104, 203, 204.

The method may further comprise compensating a time delay of the received wireless signals 105, 106, 205, 206, 214, 215, 305, 306 prior to comparing the received wireless signals 105, 106, 205, 206, 214, 215, 305, 306.

In addition, the method may comprise decomposing the received wireless signals 105, 106, 205, 206, 214, 215, 305, 306 into Mel Frequency Cepstral Coefficients 322, and comparing the determined Mel Frequency Cepstral Coefficients 322 and providing respective comparison results 108, 208, 216, 308. Comparing the Mel Frequency Cepstral Coefficients 322 may comprise determining respective Mel Frequency Cepstral Coefficients 322 of two received wireless signals 105, 106, 205, 206, 214, 215, 305, 306 to match if they comprise less than a predetermined distance to each other.

The method may in addition or as alternative comprise performing a dynamic time warping on the received wireless signals 105, 106, 205, 206, 214, 215, 305, 306 and providing respective comparison results 108, 208, 216, 308. Further, in addition or as alternative, the method may comprise performing a linear predictive coding on the received wireless signals 105, 106, 205, 206, 214, 215, 305, 306, and comparing coefficients 326 resulting from the linear predictive coding to provide respective comparison results 108, 208, 216, 30).

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In the foregoing detailed description, various features are grouped together in one or more examples or examples for the purpose of streamlining the disclosure. It is understood that the above description is intended to be illustrative, and not restrictive. It is intended to cover all alternatives, modifications and equivalents as may be included within the scope of the invention. Many other examples will be apparent to one skilled in the art upon reviewing the above specification.

Specific nomenclature used in the foregoing specification is used to provide a thorough understanding of the invention. However, it will be apparent to one skilled in the art in light of the specification provided herein that the specific details are not required in order to practice the invention. Thus, the foregoing descriptions of specific embodiments of the present invention are presented for purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. Throughout the specification, the terms "including" and "in which" are used as the plain-English equivalents of the respective terms "comprising" and "wherein," respectively. Moreover, the terms "first," "second," and "third," etc., are used merely as labels, and are not intended to impose numerical requirements on or to establish a certain ranking of importance of their objects.

LIST OF REFERENCE SIGNS 100, 200, 300 signal assessment system
101, 102, wireless signal receiver
201, 202, 212, 213 wireless signal receiver
301, 302 wireless signal receiver
103, 104, 203, 204 source signal
105, 106, 205, 206 received wireless signal
214, 215, 305, 306 received wireless signal
107, 207, 307 signal comparator
108, 208, 216, 308 comparison result
109, 209, 217, 309 user indicator 110, 210, 218, 310 indication signal
219 server
320 delay compensator
321 decomposition unit
322 Mel Frequency Cepstral Coefficients
323 coefficient comparator
324 warping unit
325 linear predictive coding unit
326 coefficients
327 filter coefficient comparator
328 signal evaluation unit
150, 151 aircraft
252, 253 air traffic control system
S1-S4 method steps

What we claim is:

1. A signal assessment system for assessing air traffic control signals, the signal assessment system comprising:
at least two wireless signal receivers configured to receive wireless signals,
a signal comparator coupled to the wireless signal receivers and configured to compare the received wireless signals and to provide respective comparison results; and
a user indicator coupled to the signal comparator configured to indicate to a user based on the comparison results if the received wireless signals originate from the same wireless source signal or if the received wireless signals originate from different wireless source signals.

2. The system of claim 1, wherein the signal comparator comprises a server that is communicatively coupled to the single wireless signal receivers.

3. The system of claim 1, wherein the signal comparator comprises a delay compensator that is configured to compensate a time delay of the received wireless signals prior to comparing the received wireless signals.

4. The system of claim 1, wherein the signal comparator comprises a decomposition unit configured to decompose the received wireless signals into Mel Frequency Cepstral Coefficients, and wherein the signal comparator comprises a coefficient comparator that is configured to compare the determined Mel Frequency Cepstral Coefficients and provide respective comparison results.

5. The system of claim 4, wherein the coefficient comparator is configured to determine respective Mel Frequency Cepstral Coefficients of two received wireless signals to match if they comprise less than a predetermined distance to each other.

6. The system of claim 4, wherein the signal comparator comprises a warping unit configured to perform a dynamic time warping on the received wireless signals and to provide respective comparison results.

7. The system of claim 4, wherein the signal comparator comprises a linear predictive coding unit configured to perform a linear predictive coding on the received wireless signals, and wherein the signal comparator comprises a filter coefficient comparator that is configured to compare coefficients resulting from the linear predictive coding to provide respective comparison results.

8. The system of claim 4, further comprising a signal evaluation unit that is configured to determine based on the results provided by the signal comparator if the received wireless signals originate from the same source signal or if the received wireless signals originate from different source signals.

9. A signal assessment method for assessing air traffic control signals, the signal assessment method comprising:
receiving wireless signals with at least two wireless receivers,
comparing the received wireless signals;
providing respective comparison results; and
indicating to a user based on the comparison results if the received wireless signals originate from the same wireless source signal or if the received wireless signals originate from different wireless source signals.

10. The method of claim 9, wherein comparing the received wireless signals and providing respective comparison results is performed with a server that is communicatively coupled to the single wireless signal receivers.

11. The method of claim 9, further comprising compensating a time delay of the received wireless signals prior to comparing the received wireless signals.

12. The method of claim 9, further comprising decomposing the received wireless signals into Mel Frequency Cepstral Coefficients, and comparing the determined Mel Frequency Cepstral Coefficients and providing respective comparison results.

13. The method of claim 12, wherein comparing the Mel Frequency Cepstral Coefficients comprises determining respective Mel Frequency Cepstral Coefficients of two received wireless signals to match if they comprise less than a predetermined distance to each other.

14. The method of claim 12, further comprising performing a dynamic time warping on the received wireless signals and providing respective comparison results.

15. The method of claim 12, further comprising performing a linear predictive coding on the received wireless signals, and comparing coefficients resulting from the linear predictive coding to provide respective comparison results.

16. The method of claim 12, further comprising determining based on the comparison results if the received wireless signals originate from the same source signal or if the received wireless signals originate from different source signals.

* * * * *